(12) United States Patent
Ho et al.

(10) Patent No.: US 10,754,124 B2
(45) Date of Patent: Aug. 25, 2020

(54) DRIVING MECHANISM

(71) Applicant: TDK TAIWAN CORP., Yangmei, Taoyuan (TW)

(72) Inventors: Liang-Ting Ho, Yangmei Taoyuan (TW); Cheng-Kai Yu, Yangmei Taoyuan (TW); Chao-Chang Hu, Yangmei Taoyuan (TW); Chih-Wei Weng, Yangmei Taoyuan (TW); Che-Wei Chang, Yangmei Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 243 days.

(21) Appl. No.: 15/816,020

(22) Filed: Nov. 17, 2017

(65) Prior Publication Data

US 2018/0136438 A1 May 17, 2018

Related U.S. Application Data

(60) Provisional application No. 62/423,361, filed on Nov. 17, 2016.

(30) Foreign Application Priority Data

Oct. 26, 2017 (CN) .......................... 2017 1 1013190

(51) Int. Cl.
*G02B 7/18* (2006.01)
*G03B 5/00* (2006.01)
*H02K 7/06* (2006.01)
*G02B 27/64* (2006.01)
*H02K 41/035* (2006.01)
(Continued)

(52) U.S. Cl.
CPC ........... *G02B 7/1805* (2013.01); *G02B 7/005* (2013.01); *G02B 13/001* (2013.01); *G02B 27/64* (2013.01); *G02B 27/646* (2013.01); *G03B 5/00* (2013.01); *H02K 7/06* (2013.01); *H02K 41/0356* (2013.01);
(Continued)

(58) Field of Classification Search
CPC .. G02B 7/1805; G02B 27/646; G02B 13/001; G02B 7/005; G02B 27/64; G02B 7/09; G02B 13/0065; G02B 7/023; G02B 26/08; G02B 26/0891; G02B 26/101; G02B 26/108; H02K 41/0356; H02K 7/06;
(Continued)

(56) References Cited

U.S. PATENT DOCUMENTS

2009/0225452 A1* 9/2009 Wu .................. G02B 7/023
 359/824
2016/0341974 A1* 11/2016 Kishine .................. G03B 43/00

* cited by examiner

*Primary Examiner* — Jade R Chwasz
(74) *Attorney, Agent, or Firm* — Muncy, Geissler, Olds & Lowe, P.C.

(57) ABSTRACT

A driving mechanism for supporting an optical member is provided, including a fixed module, a movable module, a driving module disposed therebetween, and an elastic member. The driving module can drive the movable module to rotate around a first rotation axis relative to the fixed module. The elastic member includes a first connecting portion connected to the movable module, a second connecting portion connected to the fixed module, a first string portion connected to the first connecting portion, and a first buffer portion connected to the first string portion. The first string portion is disposed on the first rotation axis. The longitudinal axis of the first string portion is parallel to the first rotation axis. The first buffer portion has wave-shaped structure.

12 Claims, 6 Drawing Sheets

(51) Int. Cl.
*G02B 7/00* (2006.01)
*G02B 13/00* (2006.01)

(52) U.S. Cl.
CPC .................. *G03B 2205/003* (2013.01); *G03B 2205/0069* (2013.01); *H02K 2201/18* (2013.01)

(58) Field of Classification Search
CPC .................. H02K 2201/18; G03B 5/00; G03B 2205/003; G03B 2205/0069
USPC ...... 359/831, 833, 202.1, 203.1, 213.1, 872, 359/873, 874, 876, 881
See application file for complete search history.

DRIVING MECHANISM

CROSS REFERENCE TO RELATED APPLICATIONS

This application claims the benefit of U.S. Provisional Application No. 62/423,361, filed Nov. 17, 2016, and China Patent Application No. 201711013190.0, filed Oct. 26, 2017, the entirety of which are incorporated by reference herein.

BACKGROUND OF THE INVENTION

Field of the Invention

The application relates in general to a driving mechanism, and in particular, to a driving mechanism having an elastic member.

Description of the Related Art

As technology has advanced, a lot of electronic devices (such as digital cameras and smartphones) have been given the functionality of taking photographs and recording video. These electronic devices have become more commonplace, and have been developed to be more convenient and thin. More and more options are provided for users to choose from.

Some electronic devices with the functionality of taking photographs or recording video include an elastic member and a driving mechanism to hang an optical member and drive the optical member to rotate, so as to achieve the purpose of image stabilization. However, when the optical member rotates, the elastic member might become broken or damaged due to the concentration of stress. Thus, how to address the aforementioned problem has become an important issue.

BRIEF SUMMARY OF INVENTION

To address the deficiencies of conventional products, an embodiment of the invention provides a driving mechanism for supporting an optical member, including a fixed module, a movable module, a driving module disposed therebetween, and an elastic member. The driving module can drive the movable module to rotate around a first rotation axis relative to the fixed module. The elastic member includes a first connecting portion connected to the movable module, a second connecting portion connected to the fixed module, a first string portion connected to the first connecting portion, and a first buffer portion connected to the first string portion. The first string portion is disposed on the first rotation axis. The longitudinal axis of the first string portion is parallel to the first rotation axis. The first buffer portion has wave-shaped structure.

In some embodiments, the elastic member further comprises a plurality of first buffer portions, and the first buffer portions are symmetrical relative to the first rotation axis.

In some embodiments, the first buffer portion is disposed between the first connecting portion and the first string portion.

In some embodiments, the first buffer portion has a section contacting the first connecting portion, and the longitudinal axis of the section is parallel or perpendicular to the first rotation axis.

In some embodiments, the first buffer portion is disposed between the second connecting portion and the first string portion.

In some embodiments, the driving module further comprises a plurality of first buffer portions, and the first string portion is disposed between the first buffer portions.

In some embodiments, at least one first buffer portion has a section contacting the first connecting portion, and the longitudinal axis of the section is parallel or perpendicular to the first rotation axis.

In some embodiments, the driving module can drive the movable module to rotate around a second rotation axis relative to the fixed module, and the elastic member further comprises a second string portion and a second buffer portion. The second string portion is disposed on the second rotation axis, and the longitudinal axis of the second string portion is parallel to the second rotation axis. The second buffer portion is connected to the second string portion, and the second buffer portion has wave-shaped structure. The first rotation axis is different from the second rotation axis.

In some embodiments, the elastic member further comprises a third connecting portion, connected to the first string portion and the second string portion.

In some embodiments, the third connecting portion has a tapered structure connected to the first buffer portion.

In some embodiments, the elastic member comprises a plurality of second buffer portions, and the second buffer portions are symmetrical relative to the second rotation axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
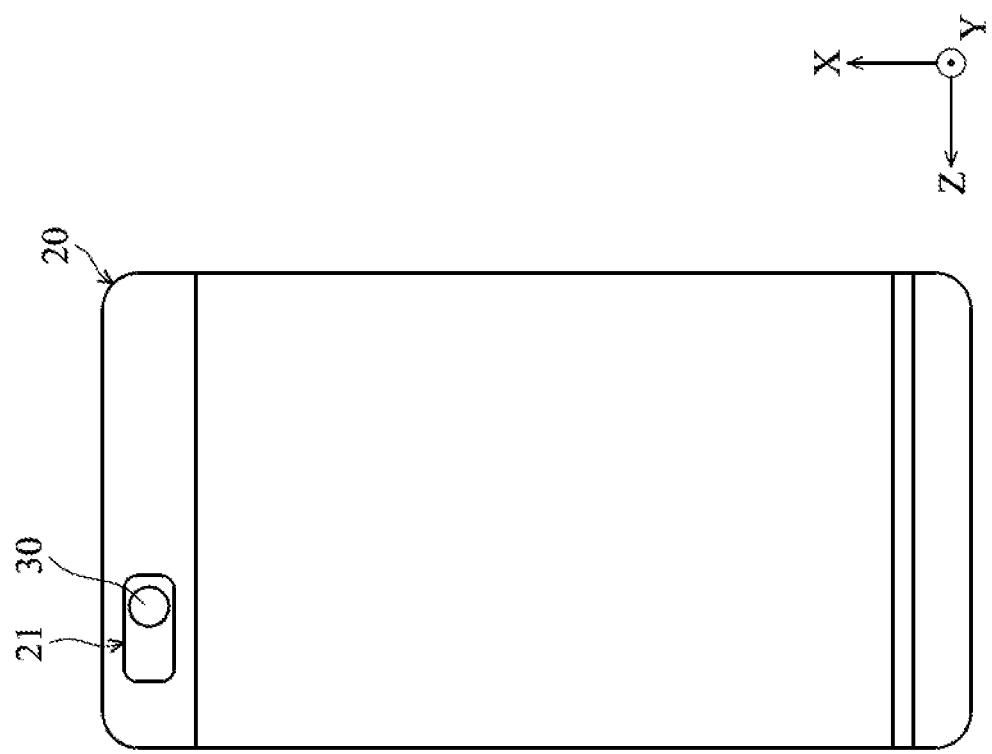
FIG. 1 is a schematic diagram of an electronic device according to an embodiment of the invention.
Figure 2:
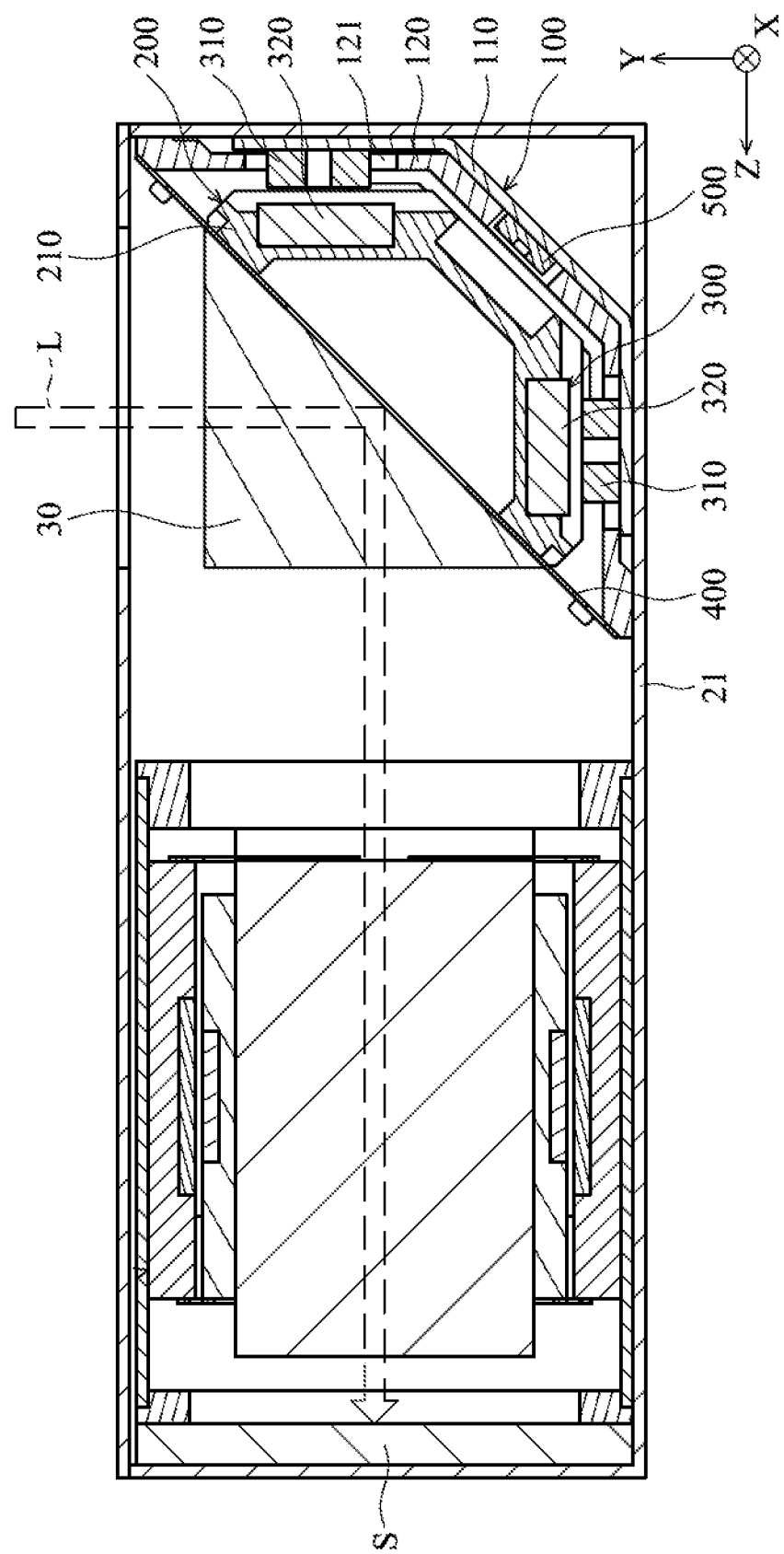
FIG. 2 is a schematic diagram of a driving mechanism according to an embodiment of the invention, wherein the driving mechanism is disposed in the electronic device and supports an optical member.

Referring to FIGS. 1 and 2, in an embodiment of the invention, a driving mechanism 10 can be disposed in an electronic device 20 and used to support and drive an optical member 30, so that the optical member 30 can rotate relative to an image sensor S in the electronic device 20, and the purpose of image stabilization can be achieved. For example, the electronic device 20 can be a digital camera or a smartphone having the function of capturing photographs or making video recordings, and the optical member 30 can be a prism. When the user takes a photo or records a video, a light L can be reflected by the optical member 30, and the reflected light L can be received by the image sensor S.

Figure 3:
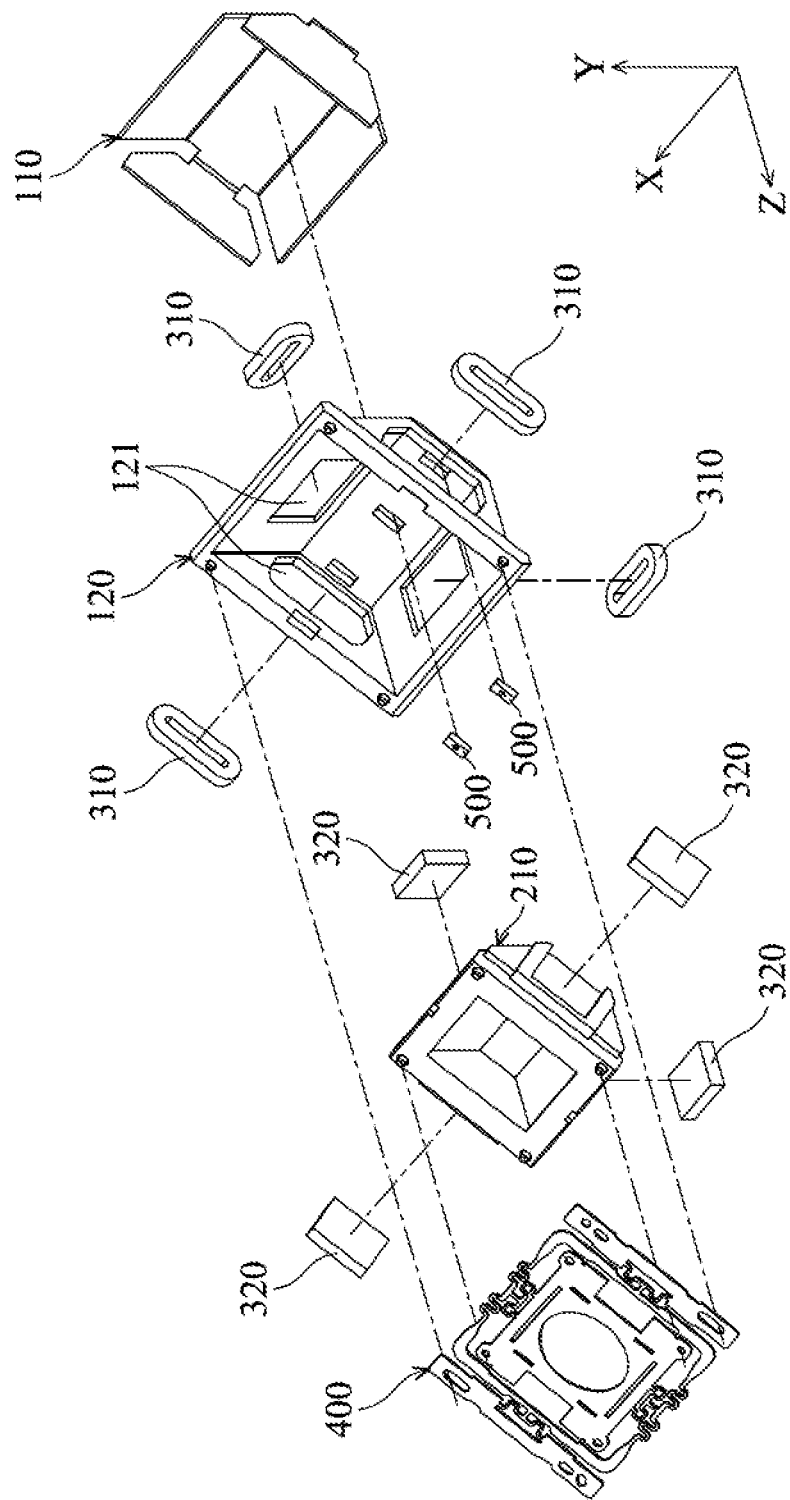
FIG. 3 is an exploded-view diagram of a driving mechanism according to an embodiment of the invention.

Referring to FIGS. 2 and 3, the driving mechanism primarily comprises a fixed module 100, a movable module 200, a driving module 300, an elastic member 400, and a plurality of position detectors 500. The fixed module 100 comprises a base 110 and a frame 120. The movable module 200 comprises an optical member holder 210. The driving module 300 comprises a plurality of first electromagnetic driving assemblies 310 and a plurality of second electromagnetic driving assemblies 320.

The base 110 of the fixed module 100 can be affixed to a housing 21 of the electronic device 20, and the frame 120 can be affixed to the base 110. The frame has a plurality of holes 121. The position detectors 500 and the first electromagnetic driving assemblies 310 can be disposed on the base 110 and respectively accommodated in the holes 121.

As shown in FIGS. 2 and 3, the optical member 30 and the optical member holder 210 of the movable module 200 can be hung on the fixed module 100 by the elastic member 400, and the second electromagnetic driving assemblies 320 are disposed on the optical member holder 210 and adjacent to the first electromagnetic driving assemblies 310. The optical member 30 and the optical member holder 210 can be driven by electromagnetic effect between the first electromagnetic driving assemblies 310 and the second electromagnetic driving assemblies 320 and rotate relative to the fixed module 100.

For example, in this embodiment, the first electromagnetic driving assemblies 310 can comprise a driving coil, and the second electromagnetic driving assemblies 320 can comprise at least one magnet. When a current flows through the driving coil (the first electromagnetic driving assembly 310), electromagnetic effect is generated between the driving coil and the magnet, and an electromagnetic force can be generated to drive the optical member holder 210 to rotate. Since the optical member 300 is connected to the optical member holder 210 by the elastic member 400, the driving module 300 can also drive the optical member 30 to rotate relative to the fixed module 100. Thus, the position where the light L reaches the image sensor S can be finely adjusted.

When the optical member 30 and the optical member holder 210 rotate relative to the fixed module 100, the position detectors 500 can obtain the rotating angle of the optical member 30 by detecting the position of the second electromagnetic driving assemblies 320. For example, the position detector 500 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the first electromagnetic driving assemblies 310 can be magnets, and the second electromagnetic driving assemblies 320 can be driving coils.

Figure 4:
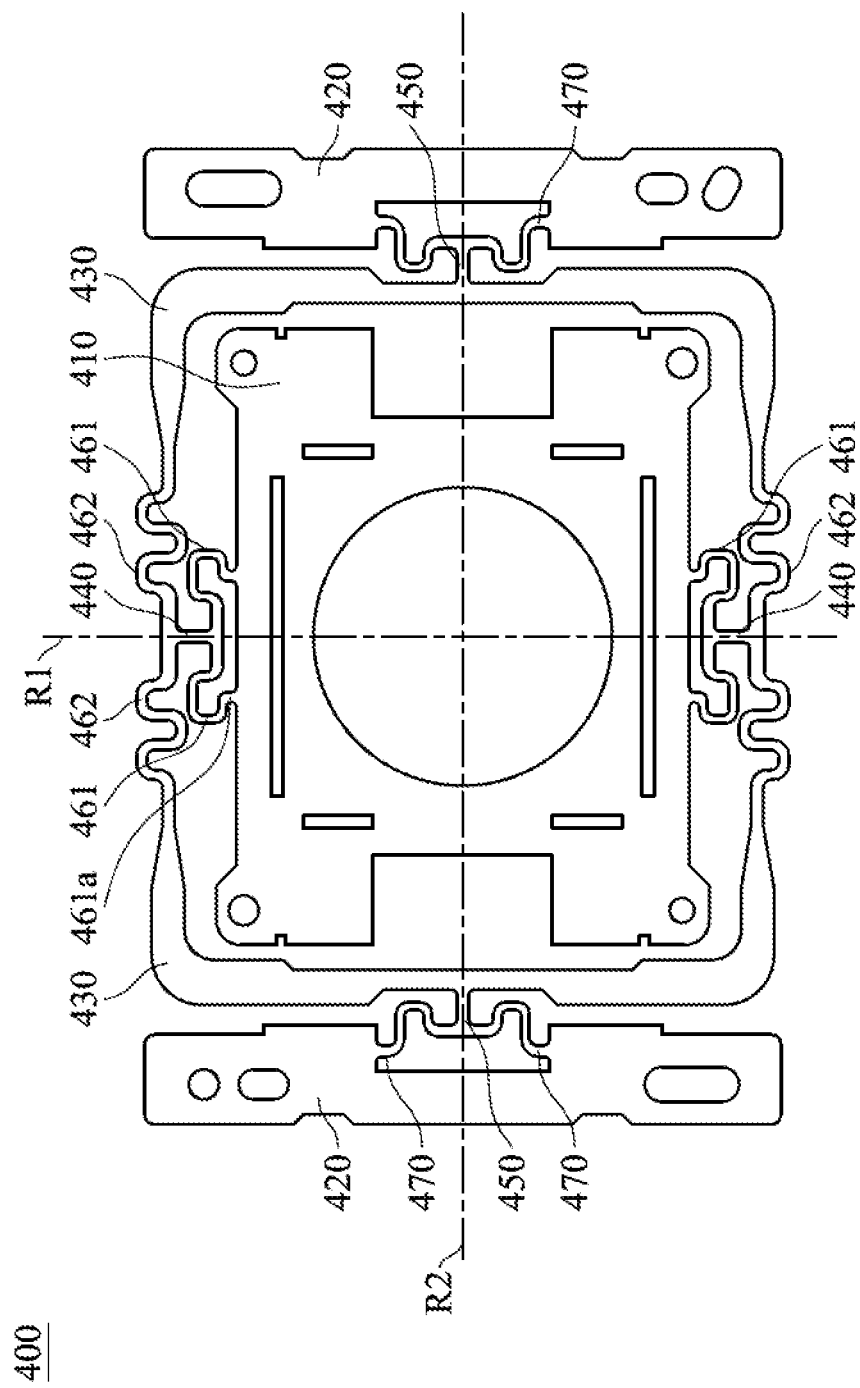
FIG. 4 is a schematic diagram of an elastic member according to an embodiment of the invention.

The specific structure of the elastic member 400 in this embodiment is discussed below. Referring to FIG. 4, the elastic member 400 comprises a first connecting portion 410, at least one second connecting portion 420, at least one third connecting portion 430, at least one first string portion 440, at least on second string portion 450, a plurality of first buffer portions 461 and 462, and a plurality of second buffer portions 470. The optical member 30 and the optical member holder 210 can be respectively affixed to the opposite surfaces of the first connecting portion 410, and the second connecting portion 420 can be affixed to the frame 120, so as to hang the optical member 30 and the optical member holder 210.

The third connecting portion 430 is used to connect the first connecting portion 410 and the second connecting portion 420. Specifically, the first string portion 440 and the first buffer portions 461 and 462 are disposed between the third connecting portion 430 and the first connecting portion 410.

The driving module 300 can drive the movable module 200 to rotate around a first rotation axis R1 and a second rotation axis R2 relative to the fixed module 100. The first string portion 440 is disposed on the first rotation axis R1, and the longitudinal axis of the first string portion 440 is parallel to the first rotation axis R1. The first string portion 440 is respectively connected to the first connecting portion 410 and the third connecting portion 430 by the first buffer portions 461 and the second buffering portions 462, therefore, the first string portion 440 is disposed between the first buffer portions 461 and the first buffer portions 462. Furthermore, the first buffer portions 461 and 462 are symmetrical relative to the first rotation axis R1 and have wave-shaped structures. It should be noted that, the longitudinal axis of a section 461a of the first buffer portion 461 connected to the first connecting portion 410 is parallel to the first rotation axis R1, and an end of the third connecting portion 430 connected to the first buffer portion 461 has a taped structure. Therefore, the resistance force during the rotation of the movable module 200 relative to the fixed module 100 around the first rotation axis R1 can be reduced.

Since the first buffer portions 461 and 462 connected to the first connecting portion have wave-shaped structure, the stress can be dispersed and not concentrated at the first string portion 440 when the movable module 200 rotates around the first rotation axis R1 relative to the fixed module 100, and the break of the first string portion 440 can be avoided.

In some embodiments, the first buffer portions 461 or the first buffer portions 462 can be omitted to decrease the width of the elastic member 400. In other words, the first string portion 440 can be directly connected to the first connecting portion, or the first string portion 440 can be directly connected to the third portion 430. In some embodiments, the longitudinal axis of the section 461a of the first buffer portion 461 connected to the first connecting portion 410 is perpendicular to the first axis R1, so as to increase the contacting area between the first connecting portion 410 and the first buffer portion 461.

Referring to FIG. 4, the second string portion 450 and the second buffer portions 470 are disposed between the second connecting portion 420 and the third connecting portion 430, and the opposite ends of the second buffer portion 470 are respectively connected to the second connecting portion 420 and the second string portion 450. Similarly, the second string portion 450 is disposed on the second rotation axis R2, and the longitudinal axis of the second string portion 450 is parallel to the second rotation axis R2. The second buffer portions 470 are symmetrical relative to the second rotation axis R2 and have wave-shaped structures. Therefore, when the movable module 200 rotates around the second rotation axis R2 relative to the fixed module 100, the stress can be dispersed and not concentrated at the second string portion 420, and the break of the second string portion 450 can be avoided.

It should be noted that, the first rotation axis R1 is different from the second rotation axis R2. In this embodiment, the first rotation axis R1 is perpendicular to the second rotation axis R2.

Figure 5:
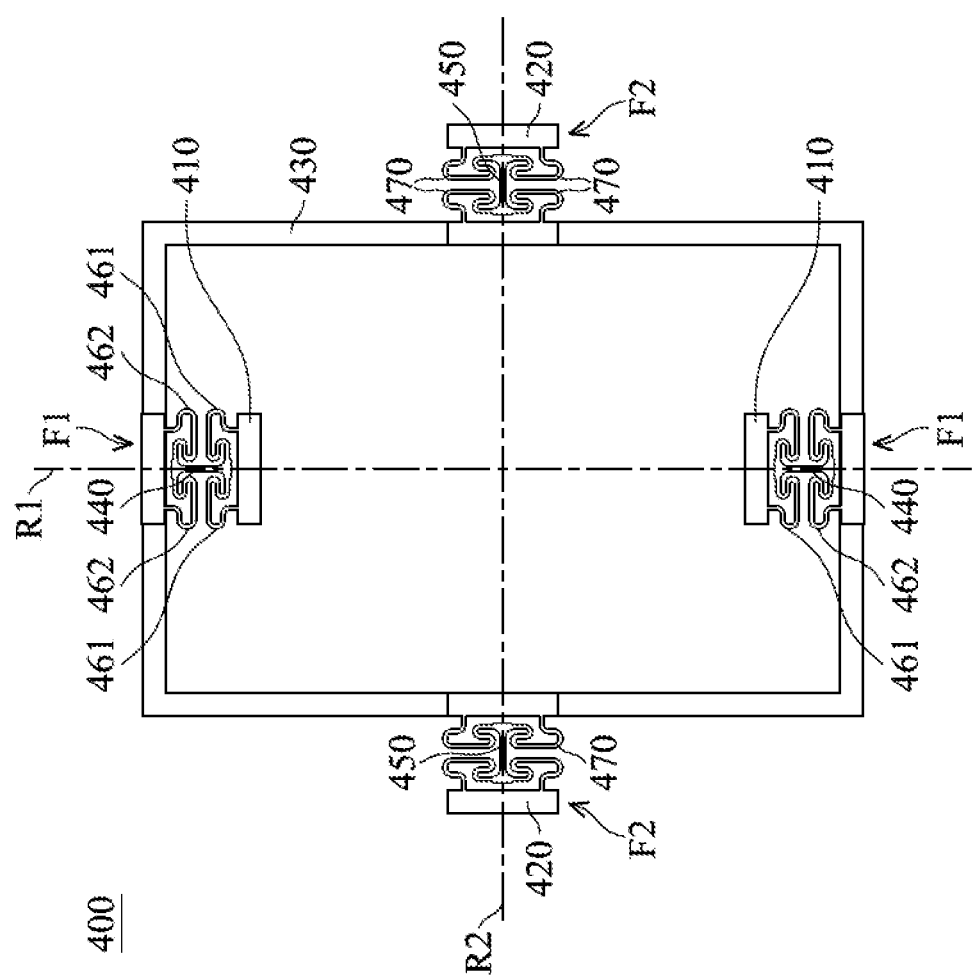
FIG. 5 is a schematic diagram of an elastic member according to another embodiment of the invention.

Referring to FIG. 5, in another embodiment, the elastic member 400 comprises a plurality of flexible sheets F1 and F2 and a third connecting portion 430, and the structure of the flexible sheet F1 is substantially the same as that of the flexible sheet F2. Each of the flexible sheet F1 at the center of FIG. 5 can form a first connecting portion 410, a string portion 440, and a plurality of first buffer portions 461 and 462, and each of the flexible sheet F2 on the sides of FIG. 5 can form a second connecting portion 420, a second string portion 450, and a plurality of second buffer portions 470.

In detail, an end of the flexible sheet F1 is affixed to the third portion 430, and other end can form the first connecting portion 410, which is used to connect the movable module 200. The flexible sheet F1 further comprises the first string portion 440 and the first buffer portions 461 and 462, wherein the first string portion 440 is disposed on the first rotation axis R1 and between the first buffer portions 461 and the second buffer portions 462. An end of the flexible sheet F2 is affixed to the third portion 430, and other end can form the second connecting portion 420, which is used to connect the fixed module 100. The flexible sheet F2 further comprises the second string portion 450 and the second buffer portions 470, wherein the second string portion 450 is disposed on the second rotation axis R2 and between the second buffer portions 470.

Since the structure of the flexible sheet F1 is substantially the same as that of the flexible sheet F2, the manufacturing efficiency of the elastic member 400 can be enhanced.

Figure 6:
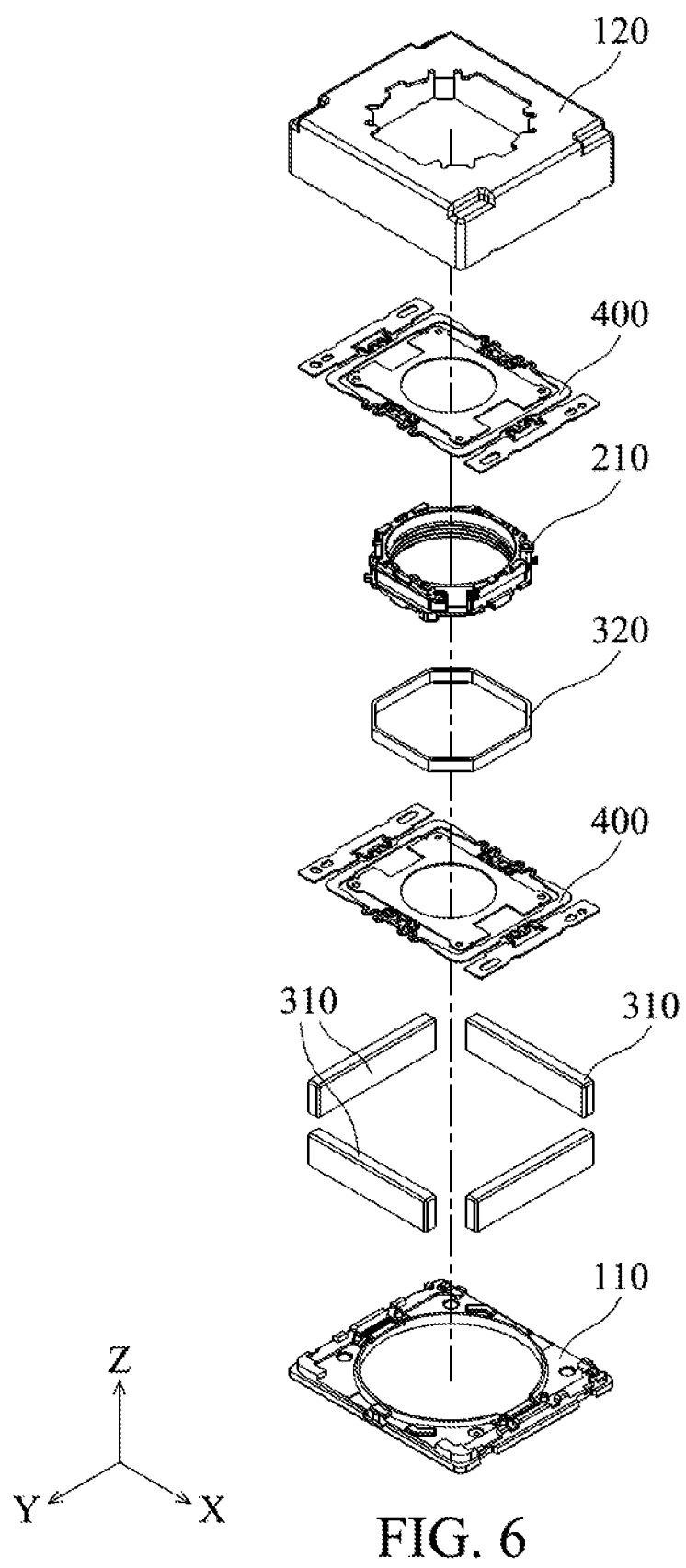
FIG. 6 is a schematic diagram of a driving mechanism according to another embodiment of the invention.

The aforementioned elastic member 400 can also be applied to a driving mechanism which drives a lens. Referring to FIG. 6, in another embodiment, a fixed module 100 of a driving mechanism comprises a base 110 and a frame 120, a movable module 200 comprises an optical member holder 210, and a driving module 300 comprises a plurality of first electromagnetic driving assemblies 310 and at least one second electromagnetic driving assembly 320. In this embodiment, the optical member 30 held by the optical member holder 210 can be a lens, and an image module S can be disposed under the base 110.

The first electromagnetic driving assemblies 310 and the second electromagnetic driving assembly 320 can be respectively affixed to the fixed module 110 and the optical member holder 210. The optical member 30 and the optical member holder 210 can be driven by electromagnetic effect between the first electromagnetic driving assemblies 310 and the second electromagnetic driving assembly 320 and rotate relative to the fixed module 100.

The optical member holder 210 is disposed between two elastic members 400. The first connecting portion 410 and the second connecting portion 420 are respectively affixed to the optical member holder 210 and the frame 120, so as to hang the optical member holder 210. Since the elastic member 400 has the first string portion 440, the first buffer portions 461 and 462, the second string portion 450, and the second buffer portions 470, the stress can be dispersed and not concentrated at the first and second string portions 440 and 450 when the movable module 200 rotates around the first rotation axis R1 and/or the second rotation axis R2 relative to the fixed module 100, and the break of the first and second string portions 440 and 450 can be avoided.

In summary, a driving mechanism is provided, including a fixed module, a movable module, a driving module, and an elastic member, wherein the driving module can drive the movable module to rotate around a first rotation axis and/or a second rotation axis relative to the fixed module. Since the elastic member has the first string portion, the first buffer portions, the second string portion, and the second buffer portions, the stress can be dispersed, and the break of the first and second string portions and can be avoided.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for supporting an optical member, comprising:
   a fixed module;
   a movable module;
   a driving module, disposed between the fixed module and the movable module, and the driving module can drive the movable module to rotate around a first rotation axis relative to the fixed module; and
   an elastic member, connected to the fixed module and the movable module and having a plate structure, comprising:
      a first connecting portion, connected to the movable module;
      a second connecting portion, connected to the fixed module;
      a first string portion, disposed on the first rotation axis and connected to the first connecting portion, wherein the longitudinal axis of the first string portion is parallel to the first rotation axis; and
      a first buffer portion, connected to the first string portion, wherein the first buffer portion has a wave-shaped structure,
   wherein the first connection portion directly connects to the movable portion and does not contact the fixed portion directly, the second connection portion directly connects to the fixed portion and does not contact the movable portion directly, and the first connecting portion is connected to the second connecting portion via the first string portion.

2. The driving mechanism as claimed in claim 1, wherein the elastic member further comprises a plurality of first buffer portions, and the first buffer portions are symmetrical relative to the first rotation axis.

3. The driving mechanism as claimed in claim 1, wherein the first buffer portion is disposed between the first connecting portion and the first string portion.

4. The driving mechanism as claimed in claim 3, wherein the first buffer portion has a section contacting the first connecting portion, and the longitudinal axis of the section is parallel or perpendicular to the first rotation axis.

5. The driving mechanism as claimed in claim 1, wherein the first buffer portion is disposed between the second connecting portion and the first string portion.

6. The driving mechanism as claimed in claim 1, wherein the driving module further comprises a plurality of first buffer portions, and the first string portion is disposed between the first buffer portions.

7. The driving mechanism as claimed in claim 6, wherein at least one first buffer portion has a section contacting the first connecting portion, and the longitudinal axis of the section is parallel or perpendicular to the first rotation axis.

8. The driving mechanism as claimed in claim 1, wherein the driving module can drive the movable module to rotate around a second rotation axis relative to the fixed module, and the elastic member further comprises:
    a second string portion, disposed on the second rotation axis, wherein the longitudinal axis of the second string portion is parallel to the second rotation axis; and
    a second buffer portion, connected to the second string portion, wherein the second buffer portion has a wave-shaped structure, and the first rotation axis is different from the second rotation axis.

9. The driving mechanism as claimed in claim 8, wherein the elastic member further comprises a third connecting portion, connected to the first string portion and the second string portion.

10. The driving mechanism as claimed in claim 9, wherein the third connecting portion has a tapered structure connected to the first buffer portion.

11. The driving mechanism as claimed in claim 8, wherein the elastic member comprises a plurality of second buffer portions, and the second buffer portions are symmetrical relative to the second rotation axis.

12. The driving mechanism as claimed in claim 1, wherein the first connecting portion has a first surface, the second connecting portion has a second surface, and the first string portion has a third surface, and the third surface connects the first surface to the second surface, wherein the first surface, the second surface and the third surface are not perpendicular to each other.

* * * * *